Patented May 21, 1946

2,400,820

UNITED STATES PATENT OFFICE 2,400,820

STABILIZATION OF CONVERTED STARCH PASTES

Sivert N. Glarum, Ardmore, Pa., and Joseph J. Thomas, Portland, Maine, assignors to Rohm & Haas Company, Philadelphia, Pa., a corporation of Delaware No Drawing. Application October 20, 1942, Serial No. 462,692

2 Claims. (Cl. 260—9)

This invention relates to homogeneous, modified starch pastes which contain converted starch and which are stabilized with a water-soluble carbamide-aldehyde type condensate. This invention further relates to the process of preparing such stabilized modified starch pastes. Specifically, this invention concerns aqueous pastes prepared from dry converted starch, stabilized by being heated in paste form with limited proportions of a water-soluble carbamide-aldehyde condensate, triazine aldehyde condensate, or mixtures thereof.

This application is a continuation-in-part of our application Serial No. 300,173, filed October 19, 1939, issued Nov. 17, 1942, as United States Patent No. 2,302,310. In our earlier application, there is described a method of stabilizing starch pastes with carbamide-aldehyde condensates with particular reference to starch pastes hydrolyzed in a wet way. The present application deals primarily with aqueous pastes of converted starch without regard to the particular method by which the paste is prepared and, specifically, with modified starch pastes prepared from dry converted starch.

In the application of starch for coating or sizing of yarn, fabrics, paper, or other materials, it is necessary to treat the raw starch in order to obtain a material which will give a satisfactory deposition possessing the proper degree of such properties as penetration, adhesion, cohesion, plasticity, solubility, body, or other characteristic. It has been the practice to boil starches to produce viscous pastes or to treat starch chemically to obtain thin-boiling pastes of improved penetration. Hydrolysis of starches with the aid of an acidic substance or an enzyme produces pastes which have many highly desirable properties and by proper control of the process of hydrolysis it is possible to emphasize one set of properties in preference to another.

Pastes may be prepared directly from starch by wet processes, or they may also be prepared by converting starch according to dry methods, such as roasting, or heating with a trace of acid or other chemical reagent. Conversion or hydrolysis, both by wet methods and by dry methods, is today well known and commonly practiced. As a result of such conversion, starch is rendered "soluble." The raw starch is changed to soluble starches, dextrins, and sugars, although in commercial practice sugars are generally present in definitely limited amounts. Extent of conversion is generally determined not by chemical change but rather by viscosity, solubility, or other physical characteristic or combination of properties, since the object of conversion is to give pastes of viscosities and solids contents which meet requirements of the many and varied applications of starch pastes. While the art has developed methods and means for producing starch pastes with the desired solids content, solubility, and body, there remains the problem of stabilizing the various pastes without altering their utility for any intended application.

This problem is present whether the pastes are prepared directly in a wet way or are prepared by taking up with water a dry solubilized starch which has been obtained by dry conversion method or which has been prepared by solubilizing in a wet way followed by drying. The pastes tend to gel on standing or otherwise separate so that they are soon unfit for the intended use. Pastes also tend to putrefy on standing.

While dry converted starches prepared in the presence of acids, alkalies, urea, or oxidizing agents are not so economical as wet-processed starch pastes, and in some applications are less desirable, nevertheless there are applications where their convenience or peculiar properties recommend them for use. As long as the dry converted starches remain in the dry, powdered form, there is no real problem as to preservation or stability. When, however, they are made into pastes, as is necessary in most applications, there arises the same necessity for stabilizing pastes made from dry solubilized starch as exists in the case of pastes made directly from starch by wet processes.

It is an object of this invention to provide a method for stabilizing partially hydrolyzed or converted starch pastes. It is an object to render such pastes highly resistant to spoilage by molds or bacteria. It is an object to preserve starch pastes which have been partially liquefied by enzymatic action so that a smooth, homogeneous, stable product is obtained. It is also an object to render stable starch pastes which have been prepared by conversion of starch in other ways than with enzymes, including conversion in the dry state. It is an object to increase the utility of converted starch pastes by reaction of aqueous pastes with a water-soluble carbamide-aldehyde addition or condensation product, particularly by the use of methylol or dimethylol urea or a methylol triazine.

It has been found that the partially hydrolyzed pastes may be stabilized by heating the hydrolyzed or converted products in paste form with a water-soluble carbamide or triazine-aldehyde reaction product. In general, a paste of the desired degree of hydrolysis or conversion is first prepared and then heated with the carbamide-aldehyde type reaction product. The paste then remains fluid, but viscous, homogeneous, stable against changes in these properties, and free from decay.

For the preparation of converted starch pastes, there may be used raw starch in a pure or crude form obtained from such sources as wheat, rye, corn, potato, sago, cassava, or the like. The starch is usually prepared in a powdered form and may readily be taken up with water to form a milk or paste or, if it is in the form of lumps or granules, it may be mechanically worked with water until a slurry results. If enzymes are to be used for conversion, the starch slurry or suspension is heated until the gelatinization point is reached. The temperature required for this varies with different starches and, in general, falls between 60° C. and 85° C. If acid is used for hydrolysis, the slurry may be similarly first heated, but this is not essential as the acid hydrolysis may start with ungelatinized slurry. When starch has been converted in a wet way, the resultant paste may be dried and powdered, in which form it may be handled and shipped with convenience and economy and stored until required for use without danger of degradation or spoilage. If starch is converted in a dry way, according to any of the known procedures, the resultant product may likewise be handled, shipped, and stored with convenience.

Hydrolysis with the aid of enzymes produces particularly desirable pastes which may be unusually well controlled in their properties. The amylases used may be obtained through the medium of fungi, glands, bacteria, or malt. Comparable results are obtained with enzymes from these different sources, although certain secondary differences in the resulting products are often of importance. In general, the procedure with enzymes is, as shown above, first to gelatinize the starch and then to allow the enzymes to react with the gelatinized starch until the desired degree of body, viscosity, solubility, etc., is reached. At this point, the enzymes are deactivated by thermal or chemical means. In enzyme hydrolysis, the pH is of particular importance, and it is advisable to adjust the pH when necessary to the region of optimum activity for the particular enzyme used. Usually a pH between about 5.8 and 7.2 is desired and, if necessary, a small amount of alkali, acid, or buffer may be added to establish the best conditions. If deactivation is accomplished with a chemical, such as an acid, the step should be carefully controlled and excess acidity subsequently neutralized.

Hydrolysis of starch in the presence of acid is feasible and may be controlled, whether accomplished in wet or dry systems, to yield modified starches or starch pastes useful for the sizing of yarns and fabrics, the coating of fibrous sheets, or the binding of paper or other materials together. Hydrolysis with acid bears a close resemblance to the procedure with enzymes but must be more critically controlled and requires acid-resisting apparatus. Organic or inorganic acids, such as hydrochloric, nitric, sulfuric, oxalic, acetic, etc., or mixtures of acids or acid-yielding salts, such as aluminum chloride, or other chemical converting agent, may be used with control of temperature, concentration, and time of reaction, as is known in the art and as illustrated, by way of example, in United States Patents 579,827; 642,329; 642,330; 642,331; 675,822, or 742,469. When the desired stage of conversion is reached, the agent is destroyed, as by neutralization. If a dry method is practiced, starch may be roasted at elevated temperatures, generally 100° C. to about 200° C., in the absence or presence of a converting agent, being agitated and heated until the desired degree of conversion is obtained. Such agent is usually an acid, which may be volatilized or consumed during the conversion or may be neutralized or inactivated when the required degree of conversion has been effected. It should be noted here that this invention is not critical as to the degree of conversion but is operable with the full range of pastes which are prepared by wet or dry conversion of starch for industrial applications.

Instead of any single type of converted starch, mixtures of two or more types may be prepared and handled in paste form.

The concentration of raw or converted starch used in preparing pastes may be widely varied. In general, pastes may be prepared with starch solids of 2% to 60%. Even higher solids contents may be obtained by gradual addition of starch during the process of hydrolysis or by carrying the dry conversion of starch to an advanced stage and taking up the dry converted starch in a limited amount of water, particularly with the aid of heat. Pastes may also be made from mixtures of converted and unconverted starch, as such pastes are also stabilized by our method. Pastes containing low percentages of solids are useful in such operations as sizing, stiffening, and finishing of fabrics. Pastes made with 2% to 15% of starch, for example, are suitable for applications such as tub-sizing of paper. Pastes made from higher concentrations of starch are particularly suitable in the beater sizing of paper, as adhesives for gummed or coated paper, adhesives for envelopes, adhesives for laminating paper to paper, paper to cloth, etc., or binding fibers together as in paper board. The utility of pastes of the full range of concentrations for the various applications of conventional starch pastes is retained when starch pastes are stabilized according to this invention by being mixed and heated with a water-soluble carbamide-aldehyde type condensate.

The carbamide-aldehyde type condensates which are useful in this invention are the water-soluble addition or condensation products obtained by reacting urea, thiourea, dicyandiamide, a triazine such as melamine, thioammeline, β,β'bisthioammeline diethyl ether, or other carbamide type material, alone or in mixtures thereof with an aldehyde, particularly formaldehyde, or mixtures of aldehydes, such as acetaldehyde and formaldehyde. The preferred material is urea-formaldehyde in the form of a methylol urea. Condensates of urea, melamine, and formaldehyde are also highly useful. The carbamide-aldehyde product is usually added after the starch has been carried to the desired stage of hydrolysis. On the other hand, when enzymes are used, the carbamide-aldehyde condensate may be added to the original slurry.

When a paste having the desired stage of hydrolysis is at hand, it is mixed with the carbamide-aldehyde type condensate, and the resulting mixtures is heated for five to thirty minutes at 60° C. or higher. Merely mixing starch paste and condensate fails to give stabilization. Heating is essential. During the heating, there is definite interaction between the carbamide-aldehyde condensate and the hydrolyzed starch products, the effects being both chemical and physical. Usually the pastes become clearer. The more concentrated pastes, which normally exhibit plastic flow, are converted to pastes exhibiting viscous flow.

As small an amount of dimethylol urea as one-half per cent, based on the weight of starch, has a distinct, beneficial effect on homogeneity and stability of the modified starch pastes. Thus, in a paste containing 20% starch, dimethylol urea is needed to the extent of only 0.1% of the total paste to have a distinct stabilizing effect. While there is no sharp upper limit to the amount of carbamide-aldehyde reaction product which may be used, amounts greater than about one part of said reaction product to four parts of starch require a careful pH control if stable liquid pastes are to be obtained. Under the conditions of reaction herein described wherein hydrogen ion control is unessential, a practical upper limit of one part of reaction product to four parts of starch must be observed. The utilization of higher ratios of reaction product requires the adjustment of conditions described in application Serial No. 300,172, filed October 19, 1939, now United States Patent No. 2,302,309, issued November 17, 1942.

The invention is illustrated by the following examples:

*Example 1*

A 20% starch slurry was prepared by taking up 20 parts of tapioca starch in 80 parts of water and adding one-fifth part of a commercial diastase from fungus. The slurry was heated with steam while being stirred mechanically, until a temperature of 70° C. was reached. This temperature was maintained for 30 minutes. The paste thus produced was divided into seven batches. The first batch was heated to 95° C. for 15 minutes. To the second batch was added 0.2% of a dimethylol urea powder, which was stirred in well and dissolved. This batch was then heated to 95° C. for 15 minutes. A third batch was treated with 2% of dimethylol urea and the fourth batch with 5% of dimethylol urea, and both batches also heated to 95° C. for 15 minutes. The fifth, sixth, and seventh batches were heated to 95° C. to inactivate the enzyme, then cooled, and 0.2%, 2%, and 5% of dimethylol urea mixed in the respective batches.

The batches were examined at the end of 2, 11, and 31 days. Batch No. 1 (untreated) had gelled in 2 days, separated in 11 days, and decayed in 31 days. Batch No. 2 had thickened slightly in 2 days but was unchanged in 11 days and still entirely satisfactory for use after the lapse of 31 days. Batch No. 3 was thick and fluid throughout the test. Batch No. 4 was likewise thick, fluid, and stable throughout the test. On the other hand, Batch No. 5 was lumpy within 2 days and moldy in 11 days. Batch No. 6 was thickened beyond usefulness in 11 days. Batch No. 7 first became very thick and then became watery before 11 days had passed.

*Example 2*

A 20% slurry of tapioca starch was prepared, heated to 70° C., cooled for a short time, and 0.5% of a commercial pancreatic diastase stirred in. When the conversion had proceeded for twenty minutes, 5% of methylol urea was added and the temperature raised to 85° C. for ten minutes. The paste was cooled and then mixed with 5 parts of titanium dioxide for each 100 parts of the paste and used for printing cotton cloth. A control sample was retained for nine months and was still suitable for use at the end of this extended period.

*Example 3*

A commercial product prepared from a mixture of corn and tapioca starches by mild acid hydrolysis was made into a thick paste of 10% solids by the addition of water. Two parts of a water-soluble, powdered urea-formaldehyde reaction product were added to the paste, which was then heated to about 90° C. with thorough stirring. The resulting paste was highly viscous, but mobile, and was stable over a long period of time.

*Example 4*

In a 1,000-gallon starch kettle equipped with an agitator and a live steam jet, 1,600 pounds of raw cornstarch was mixed with 800 gallons of cold water and 16 pounds of a commercial fungus diastase added. The mixture was stirred for five minutes and the steam turned on until a temperature of 160° F. was reached. At this temperature, the starch thickened and gelatinized, but in a few minutes the paste "melted," due to the solubilizing action of the enzyme preparation. The paste was stirred thirty minutes without any heating. The steam was then turned on again until 185° F. was reached, and this temperature was maintained for five minutes. A concentrated aqueous solution of a urea-formaldehyde condensate was then stirred in while this temperature was maintained, until 80 pounds of the condensate had been added. The resulting paste was viscous and smooth and did not show the separation which is frequently encountered with enzyme-converted cornstarch.

The starch paste was used for the tub-sizing of paper.

*Example 5*

A 35% paste of a commercial dry converted starch adhesive was prepared by mixing this dry powdered adhesive with water and heating to about 88° C. with stirring. After the paste had been stirred for 15 minutes at this temperature, the converted starch had swelled completely and the paste was free from lumps. The paste was then cooled to about 70° C. and a powdered, soluble urea-formaldehyde condensate added to the paste until an amount equal to 5% of the converted starch had been added. This paste was a highly stable one, remaining homogeneous over a long period of time and being free from decay.

When ammonium sulfate in an amount equal to 1% of the starch was mixed with the paste and the catalyzed paste was used in the manufacture of solid paper board, the board obtained had superior water resistance.

*Example 6*

A mixture of 12 parts of a commercial dextrin adhesive for fibers and 18 parts of a commercial dry converted starch for sizing was taken up in 70 parts of water and heated to 90° C., with stirring, to form a smooth paste. The paste was allowed to cool to about 75° C. At this point, there was added six parts of a clear, syrupy solution made by neutralizing a 37% solution of formaldehyde with soda ash and reacting this with melamine in the proportion of four mols of formaldehyde to one mol of melamine, refluxing the solution of reactants, and adjusting the solids content thereof to about 40%. The resulting mixture was heated at 75°–80° C. for 15 minutes and cooled. A stable converted starch paste was thus obtained.

*Example 7*

A paste having 35% solids was prepared by gelatinizing a mixture of corn and tapioca starches, hydrolyzing the gelatinized starches with a diastase of fungus origin at about 70° C., and inactivating the enzymes by heat. There was then stirred into the wet converted paste 25 parts of a commercial dextrin to produce a paste of high solids content. When the paste was smooth and homogeneous, 10 parts of a condensate made from equal weights of urea and melamine and from formaldehyde was gradually added. The resulting paste was stable over a long period of time. It was suitable for use as a box gum and, as such, was distinctly superior to conventional starch pastes.

*Example 8*

A mixture of 35 parts of a dry converted starch, 1.5 parts of a powdered, soluble urea-formaldehyde condensate which had been formed in solution in the presence of calcium chloride and dried, and 65 parts of water was stirred and heated to about 85° C. The resulting paste was a smooth one, which remained stable over a long period of time.

Examination of a series of starch pastes revealed the fact that the pH of all of these pastes, whether made by enzyme conversion, by acid hydrolysis in a wet way, or by dry conversion, was above 4.7. The addition of a carbamide-aldehyde condensate does not reduce the pH below this limit, but the addition of catalyst for hardening the condensate does. If desired, a catalyst such as ammonium thiocyanate, chloride, or phosphate, formic acid, acetic acid, or other acidic catalyst, may be added to the stabilized pastes just prior to application. The catalysts promote hardening of the carbamide-aldehyde reaction products and increase water resistance beyond that otherwise obtained from starch pastes.

The converted starch stabilized with urea-formaldehyde as in the foregoing examples may, if desired, be bodied with borax. Starch pastes treated with borax alone are too stringy or too long for most purposes. But a paste treated with 1 to 10% of a urea-formaldehyde and then treated with a few per cent. of borax is stable, possesses good tack and viscosity, and spreads well, being thus suitable as an envelope or box gum. It is, of course, possible, if desired, to modify starch pastes with gums and thickeners without destroying the stability of the pastes.

Pastes prepared as shown above are homogeneous and stable over a long period of time whereas the usual hydrolyzed pastes separate, become lumpy, stiff, and cracked, or otherwise undesirable within a few days. The method of stabilization herein described permits the preparation of pastes which are ready for use and which may be stored and shipped. They can be prepared with a viscosity and solids content suitable for any application where a dressing, sizing, stiffening, finishing, coating, or binding material is necessary. It thus becomes possible to prepare the widest variety of modified-starch pastes from a few basic types of starch with only a moderate degree of control.

In paper manufacture, the stabilized pastes may be used in beater- or tub-sizing for coating or laminating paper, etc. In laundry work, they may replace the usual boiled starch to give smoother, more supple, yet amply stiff finishes. In textile manufacture, the stabilized pastes may be used for sizing warp or fabric, along with fillers, such as clays, and with or without softeners, such as tallow or soft resins, for backfilling and stiffening for special finishes, as in denims, glazes, embossed fabrics, etc. The pastes, particularly those of high solids content, are useful as adhesives for gummed paper, envelopes, coatings, etc., and become quite water-resistant when dried, particularly under the influence of a catalyst and/or heat. The stabilized pastes, particularly those with the higher ratios of urea-formaldehyde to starch products, are useful binding agents for aqueous base printing pastes.

We claim:

1. The method of preparing a stable, modified starch paste which comprises making an aqueous paste of a water-soluble, partially hydrolyzed starch, adding to the paste and reacting therewith by means of heat between 0.5% and 25%, based on said starch, of a water-soluble condensate of urea, melamine, and formaldehyde.

2. The product obtained by the method of claim 1.

SIVERT N. GLARUM.
JOSEPH J. THOMAS.